United States Patent [19]
Hart

[11] Patent Number: 4,893,494
[45] Date of Patent: Jan. 16, 1990

[54] METHOD AND SYSTEM FOR TESTING SAFETY RELIEF VALVES

[75] Inventor: Waring F. Hart, Pearland, Tex.

[73] Assignee: Management Services International, Inc., Houston, Tex.

[21] Appl. No.: 176,309

[22] Filed: Mar. 31, 1988

[51] Int. Cl.⁴ .................... G01M 19/00; G01L 27/00
[52] U.S. Cl. ...................... 73/4 R; 73/168; 73/37
[58] Field of Search ............. 73/4 R, 37, 168, 46

[56] References Cited

U.S. PATENT DOCUMENTS

| | | |
|---|---|---|
| 2,353,275 | 7/1944 | Clair ........................................ 73/37 |
| 4,349,885 | 9/1982 | Thompson ............................ 73/4 R |
| 4,527,415 | 7/1985 | Chabat-Courrede ................. 73/4 R |
| 4,598,579 | 7/1986 | Cummings et al. .................. 73/4 R |
| 4,694,693 | 9/1987 | Gerlowski ............................ 73/168 |
| 4,766,765 | 8/1988 | Ezekoye ............................... 73/4 R |

FOREIGN PATENT DOCUMENTS 2139737  11/1985  United Kingdom .................... 73/37

OTHER PUBLICATIONS

Sales Brochure Mailer of Calder Testers (undated).
"Dynamic Testing and Maintenance of Safety Relief Valves", Chemical Engineering, Oct. 26, 1987, pp. 119-124.

Primary Examiner—Hezron E. Williams
Attorney, Agent, or Firm—Ben D. Tobor

[57] ABSTRACT

A method and system for testing safety relief valves utilizes a reservoir of high pressure fluid which is metered into a smaller pressure vessel in communication with the safety relief valve to be tested. The method and system permits a safety relief valve to be tested with air as well as water.

12 Claims, 1 Drawing Sheet

METHOD AND SYSTEM FOR TESTING SAFETY RELIEF VALVES

FIELD OF THE INVENTION

The invention relates to a method and system for testing safety relief valves, and more particularly, a method and system for determining at what pressure safety relief valves begin to open, and at what pressure the safety relief valve closes and reseats.

DISCUSSION OF THE PRIOR ART

Many types of plants and manufacturing facilities, among other locations, include the use of safety relief valves which are designed to open and release excess pressure within pressure vessels and pressure lines, when the pressure therein exceeds a predetermined pressure value. Such safety relief valves can range in size from quarter inch diameter threaded valves to twelve inch diameter safety relief valves. It is of utmost importance to be able to determine at what pressure the safety relief valve does in fact open. Although such safety relief valves are engineered and designed to open at a particular pressure, commonly referred to as the set pressure, the actual pressure, or actual set pressure, at which the valve opens is frequently different. Likewise, the design pressure at which the safety relief valve is designed to reseat, or close, may be in fact different from the actual reseat pressure. In many installations wherein safety relief valves are utilized, such as nuclear power plants, it is extremely important to know at what exact pressure such safety relief valves open, rather than what the design set pressure is.

Heretofore, safety relief valves have typically been tested by clamping the safety relief valve to a test fixture, or table, which is in fluid communication with a large volume of fluid, such as air, which fluid is maintained at a pressure slightly greater than the pressure anticipated to be necessary to open the safety relief valve. Typically, a pressure gauge is visually reviewed to determine at what pressure a safety relief valve opens. As a safety relief valve is opened, it typically opens rapidly and makes an audible report, or "pop," or "popping" noise. Typically, when the pressure in the safety relief valve rises and reaches the actual set pressure, the pop occurs. When the actual set pressure is reached, the "popping" of the valve can occur over a split second, whereby it is extremely difficult to make a visual and accurate reading of the pressure gauge to determine at what pressure the valve has in fact "popped" open. Likewise, after the pressure within the valve decreases, it is difficult to visually and accurately determine at what pressure the valve, in fact, reseats, or closes.

For example, if one were desiring to test a safety relief valve having a designed set pressure of 300 p.s.i., one would typically have available and feed into the safety relief valve a large quantity of compressed air at about 300 p.s.i., which pressure could be raised, for example, as by use of a compressor, so that the pressure could be increased until the safety relief valve were opened. Disadvantages of such a system are that an unnecessarily large pressure vessel, which can be costly, is necessary to provide the required air flow at the required pressure to test a given valve Furthermore, if one is desirous of testing a number of different sizes of safety relief valves, having a plurality of different set pressures, it will be necessary to have a number of different sized pressure vessels available for testing each of the different sized safety relief valves, having different designed set pressures. These disadvantages would be present in such a system, in addition to those problems previously described in connection with visually, and accurately, measuring the actual pressures at which the valves open and reseat.

Another method and apparatus of the prior art for testing safety relief valves consists of a clampdown table connected to a compressed-air cylinder by small diameter tubing. Problems associated with such a method and apparatus result from the fact that there is insufficient dynamic energy in such a small volume of compressed air to properly activate, or "pop" open the valve. Furthermore, if the low volume of air does open the valve, there is not a sufficient volume of air to continue to keep it open, whereby after the rapid pressure release from the opening of the valve, the full force of the valve's spring will typically slam the valve seats together with enough impact to damage the finish of the seats typically found in conventional safety relief valves. The situation that occurs in such test equipment, as well as the previously described test equipment, is that the safety relief valve could "simmer" or rapidly alternate between an open and closed position. In other words, as the necessary volume and required pressure is achieved to open the valve, the valve rapidly opens, which causes a rapid release of the pressurized air, whereby the valve quickly closes. Upon the rapid closing of the valve, the pressure once again builds up within the safety relief valve until it rapidly opens again, and the process continues and repeats itself, whereby the valve "simmers" or rapidly flutters between an open and closed position. If "simmering" occurs during testing of a safety relief valve, such valve "simmer" can misalign the internal parts on some safety relief valves, which misalignment can later result in leakage in the valve.

Previously described testing apparatus could only utilize air as the fluid used to test the safety relief valve. Separate equipment would be required if it were to be desired to hydrostatically test the safety relief valves. It would be advantageous if the same equipment could be utilized to air test, as well as hydrostatically test, the safety relief valves.

Accordingly, prior to the development of the present invention, there has been no method and system for testing the safety relief valves, which: permits both an air test and a hydrostatic test of the safety relief valve; does not require a plurality of different sizes of pressure vessels to test different sizes of safety relief valves; provides a sufficient volume of air to open the valve without simmering, and which prevents the valve seats from slamming together and damaging the valve seats; is efficient and economical to manufacture and use; permits accurate measurement of the actual pressures at which a safety relief valve opens and reseats. Therefore, the art has sought a method and system for testing safety relief valves, which: can test the safety relief valve with both an air test and hydrostatic test; does not require a plurality of different sizes of pressure vessels to test different sizes of safety relief valves; provides a sufficient volume of pressurized air to test safety relief valves without simmering of the valve, and prevents the seats from slamming together upon reseating of the valve; is efficient and economical to manufacture and use; and permits an accurate measurement of the actual pressures at which a safety relief valve opens and reseats.

SUMMARY OF THE INVENTION

In accordance with the invention the foregoing advantages have been achieved through the present method for testing a safety relief valve. The present invention includes the steps of: disposing the safety relief valve in unrestricted fluid communication with a first pressure vessel; disposing the first pressure vessel in fluid communication with a reservoir of high pressure fluid; disposing between the first pressure vessel and the reservoir, a means for controlling the fluid flow between the first pressure vessel and the reservoir; maintaining the pressure of the high pressure fluid in the reservoir at a substantially greater pressure than the pressure in the first pressure vessel; and metering high pressure fluid from the reservoir into the first pressure vessel, by utilizing the fluid flow control means, to provide the necessary fluid pressure in the first pressure vessel to open the safety relief valve.

A further feature of the present invention includes the steps of disposing a second pressure vessel in fluid communication with the safety relief valve, the second pressure vessel being disposed between the first pressure vessel and the safety relief valve, disposing a fluid supply tank in fluid communication with the second pressure vessel; restricting the fluid communication between the first and second pressure vessels; and providing high pressure fluid to the fluid supply tank to force the fluid in the fluid supply tank to enter and open the safety relief valve. An additional feature of the present invention include the steps of measuring and recording the fluid pressure required to open the safety relief valve as a function of time.

In accordance with the invention, the foregoing advantages have also been achieved through the present system for testing a safety relief valve. The system of the present invention may include: a first pressure vessel; a second pressure vessel, the first pressure vessel having a larger volume than the second pressure vessel; means for releasably securing the safety relief valve in fluid communication with the second pressure vessel; first means for controlling high pressure fluid flow into the first pressure vessel; a first fluid passageway connecting, and disposed between, the first and second pressure vessels; a second fluid passageway connecting, and disposed between, the releasable securing means and second pressure vessel; a second means for controlling fluid flow between the first and second pressure vessels, the second fluid flow control means being associated with the first fluid passageway; and a water supply tank in fluid communication with the second pressure vessel and a source of high pressure fluid, whereby upon operation and opening of the first and second control means high pressure fluid enters and opens the safety relief valve; and upon operation and closing of the second fluid control means and passage of high pressure fluid into the water supply tank, the water from the water supply tank enters and opens the safety relief valve.

A further feature of the present invention is that a safety relief valve may have a movable stem associated therewith; and the system may include means for measuring the linear movement of the stem upon opening of the safety relief valve. A further feature of the present invention is that the system may include a third fluid passageway connecting, and disposed between the water supply tank and the second pressure vessel, and a check valve disposed in the third fluid passageway to prevent high pressure fluid from the second pressure vessel from entering the water supply tank when the first and second fluid control means have been opened.

The method and system for testing safety relief valves of the present invention, when compared with previously proposed prior art methods and apparatus for testing safety relief valves have the advantages of: permitting safety relief valves to be tested on the same apparatus both with air and hydrostatically; eliminates a plurality of different sized pressure vessels to be used to test different sizes of safety relief valves; provides a sufficient air volume to the safety relief valve without simmering the safety relief valve or permitting the safety relief valve seats to slam shut and damage the seats of the safety relief valve; being efficient and economical to manufacture and use; and permitting accurate measurement and recording of the actual pressure required to open and reseat the safety relief valves.

Figure 1:
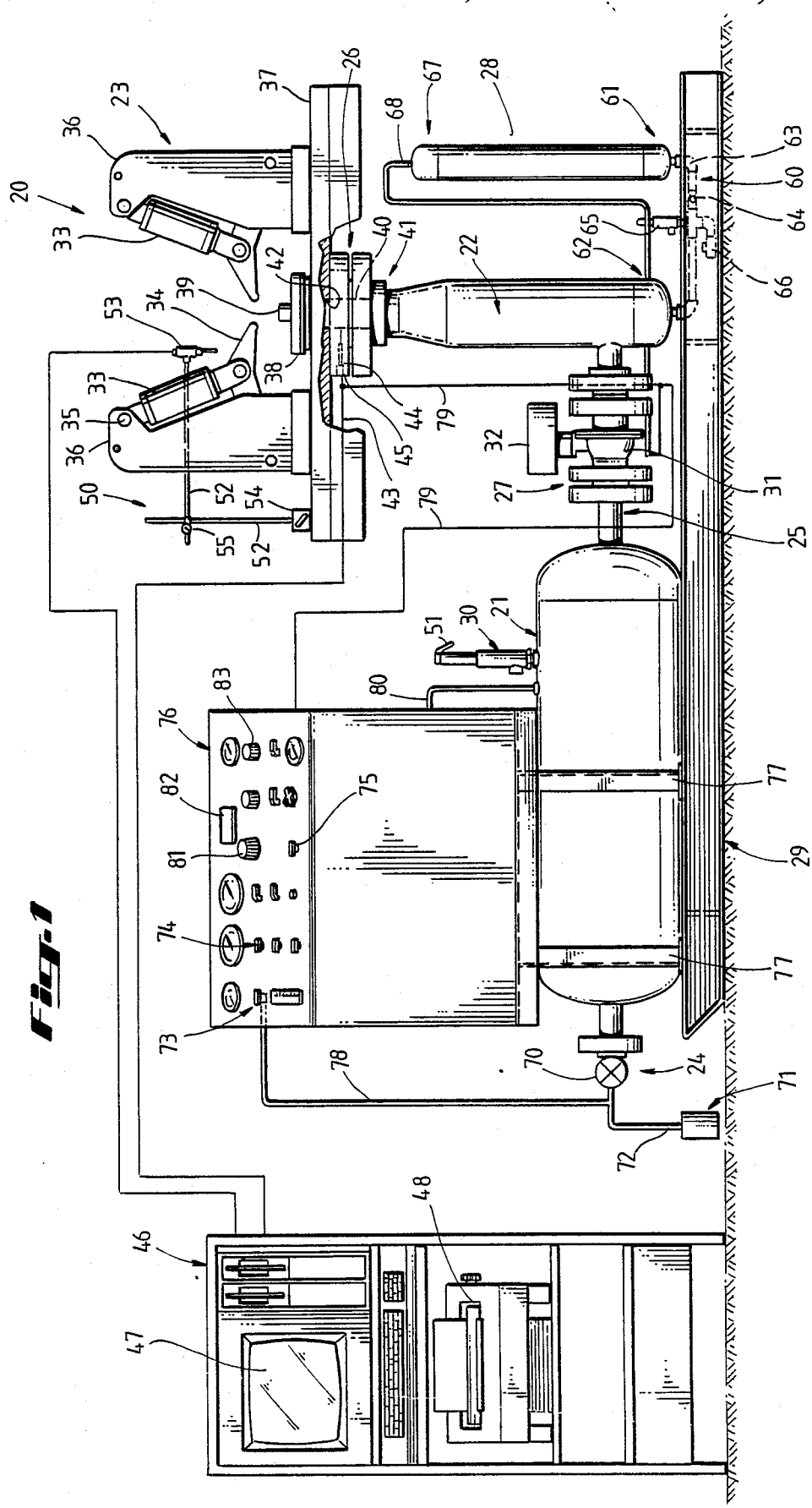
FIG. 1 is a plan view of a system for testing safety relief valves, in accordance with the present invention.

While the invention will be described in connection with the preferred embodiment, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF THE INVENTION

In FIG. 1, a system 20 for testing a safety relief valve (not shown), in accordance with the present invention is illustrated. The system 20 generally comprises a first pressure vessel 21; a second pressure vessel 22, the first pressure vessel 21, preferably having a larger volume than the second pressure vessel 22; means for releasably securing 23 a safety relief valve in fluid communication with the second pressure vessel 22; first means for controlling high pressure fluid flow 24 into the first pressure vessel 21; a first fluid passageway 25 connecting, and disposed between, the first and second pressure vessels 21,22; a second fluid passageway 26 connecting, and disposed between, the releasable securing means 23 and the second pressure vessel 22; a second means for controlling fluid flow 27 between the first and second pressure vessels, 21,22, the second fluid control means 27 being associated with the first fluid passageway 25; and a water supply tank 28 in fluid communication with the second pressure vessel 22 and a source of high pressure fluid. As will hereinafter be described in greater detail, upon operation and opening of the first and second fluid control means 24,27 high pressure fluid is permitted to enter and open the safety relief valve (not shown). Furthermore, as will hereinafter be described in greater detail, upon operation and closing of the second fluid control means 27 and passage of high pressure fluid into the water supply tank 28, water (not shown) contained within the water supply tank 28 may enter and open the safety relief valve.

Preferably, the foregoing described components of system 20 may be mounted on a conventional skid structure 29; however, the various components can be directly mounted to the floor of a plant facility as is conventional in the art. The first pressure vessel 21 is preferably of conventional, tubular construction, and is manufactured in a conventional fashion to be able to withstand the forces exerted upon it by the high pressure fluid contained therein, which is typically air. As is conventional in the art, pressure vessel 21 may be provided with a safety relief valve 30, which relief valve opens upon the pressure exceeding a predetermined limit within pressure vessel 21. Such relief valve 30 is of the type of safety relief valves which may be tested on the system 20 of the present invention, as will be hereinafter described in further detail. As an example, pressure vessel 21 may have a pressure rating of 3000 p.s.i. Preferably pressure vessel 21 is mounted upon skid structure 29 with its longitudinal axis disposed parallel with the longitudinal axis of the skid structure 29.

First fluid passageway 25, disposed between the first and second pressure vessels 21,22, may be conventional piping having the requisite strength characteristics to withstand the forces of the pressurized fluid, such as air, contained within fluid passageway 25. Associated with first fluid passageway 25 is the second fluid control means 27, which is preferably a flanged ball valve 31, of conventional design having an actuator 32. Preferably actuator 32 is a pneumatic actuator, which provides instantaneous opening of ball valve 31 upon receipt of a suitable control signal to actuator 32. It should be noted that any type of valve, other than a flanged ball valve 31 may be utilized in the second fluid control means 27, provided it can withstand the forces exerted upon it by the pressures contained within it, and can readily be opened by a suitable actuator 32, upon receipt of the necessary control signal. Furthermore, a manually operated valve, without an actuator may also be utilized. The second pressure vessel 22 is preferably disposed in a vertical orientation to skid structure 29, and is disposed beneath releasable securing means 23, as will be hereinafter described in greater detail. Not only is the second pressure vessel 22 manufactured of a suitable material which is able to withstand the forces exerted upon it by the high pressure fluids contained therein, such as air, but, as will hereinafter be described in greater detail, pressure vessel 22 may contain water as well. Accordingly, second pressure vessel 22 is preferably manufactured of a corrosion resistant material, such as stainless steel. Second pressure vessel 22 may likewise, as an example, have a pressure rating of 3000 p.s.i.

Releasable carrying means 23 preferably comprises a plurality of hydraulic rams 33, each having a clamp arm 34 disposed at one end and a pivotal connection 35 to hydraulic ram supports 36. Hydraulic ram supports 36 are disposed upon a clamp table 37 which is supported upon skid structure 29 by a plurality of conventional legs (not shown). Hydraulic ram supports 36 are movable with respect to the longitudinal axis of clamp table 37, so as to be able to accommodate various sizes of safety relief valves, as will be hereinafter described; however, hydraulic ram supports 36 are not movable with respect to the longitudinal axis of second pressure vessel 22. Disposed upon clamp table 37 are a seal plate 38 having a plurality of concentric O-rings (not shown) disposed on the upper surface of seal plate 38. The safety relief valve to be tested, in the case of a conventional flanged safety relief valve, has the flange of the safety relief valve disposed upon seal plate 38. Upon supplying hydraulic fluid to hydraulic ram 33, the clamp arms 34 are moved downwardly into engagement with the flange of the safety relief valve in a conventional manner in order to clamp, or releasably secure, the safety relief valve to clamping table 37.

As previously described, hydraulic ram supports 36, of which there are preferably three or more equidistantly and radially spaced upon the upper surface of clamping table 37, are thus movable with respect to the longitudinal axis of clamping table 37, in order to accommodate different sizes of flanges of safety relief valves. In the case of testing safety relief valves such as the smaller sizes of threaded safety relief valves such as safety relief valve 30 used with pressure vessel 21, a threaded adapter 39 may be received within seal plate 38, or within table 37, whereby the safety relief valve 30 to be tested may be threaded into the adapter 39 and releasably secured to the clamping table 37 so that it may be tested. A variety of different sizes of seal plates 38 may be used in connection with clamping table 37, dependent upon the size of the safety relief valve to be tested. Each seal plate 38 has an opening therein which substantially conforms to the size of the bore of the safety relief valve.

The second fluid passageway 26 between releasable securing means 23 and the second pressure vessel 22 is formed as a bore 40 in fluid communication with the upper end 41 of pressure vessel 22 and the same size opening 42 formed in clamping table 37. Preferably, the size, or diameter, of bore 40 and opening 42 are the same size as the bore of the largest safety relief valve to be tested with system 20. If the bore 40 and opening 42 were smaller than the bore of the safety relief valve to be tested, it is likely that the supply of pressurized fluid through bore 40 and opening 42 could "starve" or "choke" the safety relief valve during the test, in that the safety relief valve would first open, but then rapidly close until sufficient pressure built up again to open the safety relief valve. This fluttering or simmering condition could cause damage to the valve seats (not shown) of the safety relief valve being tested by system 20. A means for measuring 43 the pressure in the safety relief valve at a location proximate the second fluid passageway 26 is provided as by forming an opening 44 in clamping table 37, which opening 44 communicates with the bore 40 and opening 42 in clamping table 37, and a pressure transducer 45, of conventional construction, is disposed in opening 44. It is preferable to measure the pressure being exerted upon the safety relief valve being tested at a location which is as close as possible to the safety relief valve being tested, so as to accurately measure that pressure, while minimizing the effects of fluid pressure from other portions of system 20, such as pressure conditions in the first pressure vessel 21. In other words, were the pressure to be measured in pressure vessel 21 at the time that the safety relief valve were opened, that pressure reading may not be indicative of the actual pressure within the safety relief valve, because of fluid flow conditions between the first pressure vessel 21 and the safety relief valve disposed upon the clamping table 37.

Preferably, the signals from pressure transducer 45 are transmitted to a data acquisition and analysis system 46, which operates under a suitable program, to: gather test data during the test conducted by system 20; display the test data in graphical form, as upon display screen 47; and to print the test data as on a printer 48. Preferably, throughout the test conducted by system 20 upon a safety relief valve, the fluid pressure as measured by pressure measuring means 43 may be recorded by a means for recording, or data acquisition and analysis system 46, the measured pressure being recorded as a function of time.

Clamping table 37 may also be provided with a means for measuring 50 the linear movement of a portion of the safety relief valve as the valve is opened. In this regard, most safety relief valves have a movable stem which moves upwardly as the valve is opened. For example, safety relief valve 30 is provided with a stem 51 which moves upwardly as safety relief valve 30 is opened. The linear movement measuring means 50 preferably comprises a support structure 52 mounted to clamping table 37, which support structure 52 can position a linear displacement transducer 53 over the stem of the safety relief valve being tested on system 20. In this regard, the positioning of linear displacement transducer 53 may be adjusted as by the movement of support block 54 on clamping table 37 and the support bearing 55 which permits the upward and lateral adjustment of the linear displacement transducer 53. By conventional wiring, the signals generated by linear displacement transducer 53 are also transmitted to the recording means, or data acquisition and analysis system 46, whereby the measured linear movement of the stem of a safety relief valve may be displayed graphically on screen 47 or recorded graphically by printer 48 as a function of time and pressure.

The water, or fluid, supply tank 28 is preferably also vertically disposed beneath clamping table 37 on skid structure 29, and supply tank 28 may be supported by a conventional support structure (not shown for drawing clarity). Water supply tank 28 is preferably also made from a suitable stainless steel material. Water supply tank 28 is in a fluid transmitting relationship with the second pressure vessel 22, as by a third fluid passageway 60 which connects the lower end 61 of water supply tank 28 with the lower end 62 of the second pressure vessel 22. The third fluid passageway 60 may preferably comprise conventional piping 63, which is capable of withstanding the forces exerted by the pressurized fluid contained therein and may also be manufactured of stainless steel, insofar as the water from water supply tank 28 passes therethrough. Disposed within the third fluid passageway 60 is preferably a conventional check valve 64 which permits water to flow from water supply tank 28 into third fluid passageway 60 and hence into the lower end 62 of the second pressure vessel 22.

Check valve 60 does prevent flow of fluid, both air and water, from second pressure vessel 22 into the lower end 61 of the water supply tank 28, the reasons for which will be hereinafter described in greater detail. Third fluid passageway 60 may also be provided with an auxiliary, conventional safety relief valve 65, as well as a drain valve 66 to permit fluid from water, or fluid, supply tank 28 to be drained in a conventional manner. The upper end 67 of water supply tank 28 is provided with conventional piping 68 which communicates with a source of high pressure fluid, such as air, as will be hereinafter described in greater detail, whereby the high pressure fluid, or air, can enter water supply tank 28 to force the water contained within water supply tank 28 through piping 63 and into the second pressure vessel 22.

Still with reference to FIG. 1, the first fluid control means will be described in greater detail. Preferably, the first fluid control means 24 comprises a conventional ball valve 70 or other suitable valve capable of operating to open and close the flow of high pressure fluid, such as air, from a reservoir 71 of high pressure fluid into first pressure vessel 21, as well as being capable of withstanding the pressures exerted by the high pressure fluid or air. The reservoir of high pressure fluid 71 may either be a conventional air compressor, or one or more pressure vessels containing a large volume of high pressure fluid, and reservoir 71 is connected to valve 70 as by suitable, conventional piping 72. It should be noted that reservoir 71 is preferably capable of providing a volume of pressurized fluid into the first pressure vessel 21, the volume of high pressure fluid being greater than the volume of first pressure vessel 21. Thus, by metering high pressure fluid from the reservoir 71 into the first pressure vessel 21, it is possible to provide the necessary fluid pressure to open the safety relief valve, which actual set pressure is less than the fluid pressure of the reservoir 71. Such metering also provides enough volume of pressurized fluid to not only open the safety relief valve, but also to provide a cushion of fluid, so that the safety relief valve gently closes, rather than slams shut to prevent damage to the seats of the safety relief valve.

First control means 24 may also include another valve, or valves, 73,74,75, disposed in control panel housing 76. Control panel housing 76 is of any suitable, conventional construction, and is disposed on skid structure 29 as by legs 77. A high pressure feed line 78 is tapped into fluid passageway 72, whereby if the valve 70 of first control means 24 is closed, high pressure fluid can pass from reservoir 71 through tubing 72 and then into tubing 78 whereby valves 73,74,75 can draw high pressure fluid from reservoir 71. Valve 73 may be utilized to draw high pressure fluid from reservoir 71 when valve 24 is closed to supply high pressure fluid via a fluid passageway 79 to a location beneath clamping table 37. Preferably, valve 73, which is of conventional design, is utilized when it is desired to test small diameter safety relief valves, and only a small, or low volume, of pressurized air is necessary to test the smaller safety relief valve. When such valves are being tested and valve 73 has been opened, the second fluid control means 27, or valve 31 is closed, whereby the second pressure vessel 22 is filled from the reservoir 71 via tubing 72,78, valve 73 and tubing 79.

When larger safety relief valves are tested with system 20, the high pressure fluid from reservoir 71 may be provided to the safety relief valve in a variety of ways. For example, with valve 70 of the first fluid control means 24 being closed, the second fluid control means 27, or valve 31 is opened, whereby high pressure fluid is provided to the safety relief valve via the first and second pressure vessels 21,22. The high pressure fluid from reservoir 71 may be supplied and controlled via the opening of valve 73, which feeds pressurized air to safety relief valve via piping 79; or valve 74 may be opened which permits the transmission of pressurized fluid from reservoir 71 via piping 72, and 78, through valve 74, and through piping 80 into first pressure vessel 21. Additionally, with the second fluid control means 27 or valve 31 in its open position, the valve 70 of first fluid control means 24 may be opened, whereby the largest volume of high pressure fluid from reservoir 71 may pass directly from reservoir 71 via piping 72 and into first pressure vessel 21, from where it passes through valve 31 into the second pressure vessel 22. Suitable, and conventional controls may be provided to adjust the test pressure, as is schematically illustrated at 81 on control panel housing 76. Conventional digital readouts 82 of the test pressure may also be provided, as well as conventional controls 83 may be provided to control the clamping pressure of hydraulic rams 33. It should be noted that when the second fluid control means 27, or valve 31 is in its open position, the high pressure fluid from the first pressure vessel 21 is not transmitted to the water supply tank 28, insofar as the high pressure fluid, after passing from the first pressure vessel 21 through valve 31 and into the second pressure vessel 22 is precluded from entering the water supply tank 28 by the operation of check valve 64.

When it is desired to hydrostatically test a safety relief valve using system 20, it is necessary to close the second fluid control means 27 or valve 31, whereby the second pressure vessel 22 and the water supply tank 28 form an isolated hydraulic circuit. Accordingly, by providing high pressure fluid from reservoir 71, as via piping 72,78, and through valve 73 into piping 68, the high pressure fluid, or air, forces the water in water supply tank 28 to pass downwardly through the third fluid passageway 60 into the second pressure vessel 22 and hence into the safety relief valve which has been releasably clamped to clamping table 37, whereby the safety relief valve may be hydrostatically tested. When system 20 is utilized to test a large safety relief valve, the second fluid control means 27, or valve 31, as previously described, is opened, and the first and second pressure vessels 21,22 may be considered as one pressure vessel which is an unrestricted fluid communication with the safety relief valve being tested. Thus, by maintaining the pressure of the high pressure fluid in the reservoir 71 at a substantially greater pressure than the pressure in the first and second pressure vessels 21,22, which can be considered as one pressure vessel, the high pressure fluid may be metered from the reservoir 71 through the first control means 24, as previously described, to provide the necessary fluid pressure in the first pressure vessel 21,22 to open the safety relief valve.

It is to be understood that the invention is not limited to the exact details of construction, operation, and exact materials, or embodiments shown and described, as obvious modifications and equivalents will be apparent to one skilled in the art. For example, any suitable controls, including valves and switching mechanisms can be provided other than those illustrated to control the transmission of the high pressure fluid from the reservoir 71 to the safety relief valve being tested. Accordingly, the invention is therefore to be limited only by the scope of the appended claims.

I claim:

1. A method for testing a safety relief valve comprising the steps of:
   (a) disposing a first pressure vessel in fluid communication with a reservoir of high pressure fluid;
   (b) disposing between the first pressure vessel and the reservoir, a first means for controlling the fluid flow between the first pressure vessel and the reservoir;
   (c) maintaining the pressure of the high pressure fluid in the reservoir at a substantially greater pressure than the pressure in the first pressure vessel;
   (d) disposing the safety relief valve in unrestricted fluid communication with a second pressure vessel; the second pressure vessel being disposed between the first pressure vessel and the safety relief valve, the first pressure vessel having a larger volume than the second pressure vessel;
   (e) disposing between the first and second pressure vessels, a second means for controlling fluid flow between the first and second pressure vessels;
   (f) metering high pressure fluid from the reservoir through the first and second pressure vessels and into the safety relief valve, by utilizing the fluid flow control means, to provide the necessary fluid pressure in the second pressure vessel to open the safety relief valve, and to provide a sufficient, variable volume of fluid through the safety relief valve to prevent the safety relief valve from simmering and damaging the safety relief valve upon closing.

2. The method of claim 1, including the steps of disposing a fluid supply tank in fluid communication with the second pressure vessel; restricting the fluid communication between the first and second pressure vessels; and providing high pressure fluid to the fluid supply tank to force the fluid in the fluid supply tank to enter and open the safety relief valve.

3. The method of claim 2, wherein the fluid in the first pressure vessel is air, and the fluid in the fluid supply tank is water.

4. The method of claim 1, including the step of measuring and recording the fluid pressure required to open the safety relief valve as a function of time.

5. The method of claim 1, including the step of measuring the linear movement of a stem associated with the safety relief valve, recording the movement as a function of time and pressure.

6. A system for testing a safety relief valve comprising:
   (a) a first pressure vessel;
   (b) a second pressure vessel, the first pressure vessel having a larger volume than the second pressure vessel;
   (c) means for releasably securing the safety relief valve in fluid communication with the second pressure vessel;
   (d) first means for controlling high pressure fluid flow into the first pressure vessel;
   (e) a first fluid passageway connecting, and disposed between, the first and second pressure vessels;
   (f) a second fluid passageway connecting, and disposed between the releasable securing means and second pressure vessel; and
   (g) second means for controlling fluid flow between the first and second pressure vessels and into the safety relief valve, the second fluid flow control means being associated with the first fluid passageway, whereby upon operation and opening of the first and second fluid control means, high pressure fluid from the first and second pressure vessels enters and opens the safety relief valve. and to provide a sufficient variable volume of fluid through the safety relief valve to prevent said safety relief valve from simmering and damages upon closing.

7. The system of claim 6, further including a water supply tank in fluid communication with the second pressure vessel and a source of high pressure fluid, whereby upon operation and closing of the second fluid control means and passage of high pressure fluid into the water supply tank, the water from the water supply tank enters and opens the safety relief valve.

8. The system of claim 6, including means for measuring the pressure in the safety relief valve at a location proximate the second fluid passageway.

9. The system of claim 8, including means for recording the measured pressure as a function of time.

10. The system of claim 6, wherein the safety relief valve has a movable stem associated therewith; and including means for measuring the linear movement of the stem upon opening of the safety relief valve.

11. The system of claim 10, including means for recording the measured linear movement as a function of time and pressure in the safety relief valve.

12. The system of claim 7, including a third fluid passageway connecting and disposed between the water supply tank and the second pressure vessel, and a check valve disposed in the third fluid passageway to prevent high pressure fluid from the second pressure vessel from entering the water supply tank when the first and second fluid control means have been opened.

* * * * *